(12) United States Patent
Keller et al.

(10) Patent No.: US 9,717,023 B2
(45) Date of Patent: Jul. 25, 2017

(54) METHODS AND DEVICES FOR IMPROVING SESSION CONTINUITY

(75) Inventors: Ralf Keller, Würselen (DE); Magnus Hallenstål, Täby (SE); Fredrik Lindholm, Stockholm (SE); Magnus Olsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 817 days.

(21) Appl. No.: 13/382,187

(22) PCT Filed: Jul. 7, 2010

(86) PCT No.: PCT/EP2010/059738
§ 371 (c)(1),
(2), (4) Date: Mar. 14, 2012

(87) PCT Pub. No.: WO2011/003943
PCT Pub. Date: Jan. 13, 2011

(65) Prior Publication Data
US 2012/0190366 A1 Jul. 26, 2012

Related U.S. Application Data

(60) Provisional application No. 61/224,149, filed on Jul. 9, 2009.

(51) Int. Cl.
H04W 36/00 (2009.01)
H04W 80/10 (2009.01)
H04L 29/06 (2006.01)

(52) U.S. Cl.
CPC ..... *H04W 36/0022* (2013.01); *H04L 65/1083* (2013.01); *H04L 65/1016* (2013.01); *H04W 36/0011* (2013.01); *H04W 80/10* (2013.01)

(58) Field of Classification Search
None
See application file for complete search history.

(56) References Cited

U.S. PATENT DOCUMENTS 7,388,851 B2 * 6/2008 Trossen .......... 370/331
2007/0153769 A1 * 7/2007 Comstock et al. ......... 370/352
(Continued)

FOREIGN PATENT DOCUMENTS

JP 2010506481 A 2/2010
WO 2008041111 A2 4/2008

OTHER PUBLICATIONS

3rd Generation Partnership Project. "Technical Specification Group Services and System Aspects; Feasibility Study on Voice Call Continuity Support for Emergency Calls (Release 9)." 3GPP Standard, 3GPP TR 23.826, V1.1.0, Jan. 2009, Sophia-Antipolis Cedex, France.
(Continued)

*Primary Examiner* — Donald Mills
(74) *Attorney, Agent, or Firm* — Coats & Bennett PLLC

(57) ABSTRACT

A method for improving session continuity for a terminal (204') in a serving communication network (202') distinct from a home communication network (200') of the terminal (204'), wherein the serving communication network (202') comprises a session transfer node (208') for transferring sessions each comprising signaling data and media data from a first access network (210') of the serving communication network (202') to a second access network (212') of the serving communication network (202') comprises the following: Routing signaling data of a session of the terminal (204') between the first access network (210') and the home communication network (200') via the session transfer node (208') in the serving communication network (202'), receiving a session transfer request requesting the transfer of the session from the first access network (210') to the second
(Continued)

access network (212') for the terminal (204'), and transferring the session from the first access network (210') to the second access network (212'), and routing the signaling data of the session of the terminal (204') between the second access network (210') and the home communication network (200') via the session transfer node (208').

23 Claims, 10 Drawing Sheets

(56) References Cited

U.S. PATENT DOCUMENTS

| | | | |
|---|---|---|---|
| 2007/0153794 A1* | 7/2007 | Smith et al. | 370/390 |
| 2008/0089307 A1* | 4/2008 | Tuijn et al. | 370/342 |
| 2008/0247388 A1* | 10/2008 | Horn | 370/389 |

OTHER PUBLICATIONS

3rd Generation Partnership Project. "Technical Specification Group Services and Architecture; IP Multimedia Subsystem (IMS) Service Continuity; Stage 2 (Release 9)." 3GPP Standard, 3GPP TS 23.237, V9.1.0, Jun. 2009, Sophia-Antipolis Cedex, France.

3rd Generation Partnership Project. "Technical Specification Group Services and System Aspects; Voice Call Continuity (VCC) Between Circuit Switched (CS) and IP Multimedia Subsystem (IMS); Stage 2 (Release 7)." 3GPP Standard, 3GPP TS 23.206, V7.5.0, Dec. 2007, Sophia-Antipolis Cedex, France.

3rd Generation Partnership Project. "Domain Transfer Call Flows for Emergency Calls From PS to CS." 3GPP Draft, 3GPP TSG SA WG2 Meeting #62, S2-080498, Marina Del Rey, California, USA, Jan. 14-18, 2008.

3rd Generation Partnership Project. "VCC Emergency—resolving editor's note." 3GPP Draft, 3GPP TSG SA WG2 Meeting #70, S2-090470, Scottsdale, Phoenix, USA, Jan. 12-16, 2009.

3rd Generation Partnership Project. "Provisioning of VDN and VDI." 3GPP Draft, 3GPP TSG SA WG2 Meeting #55, S2-063866, Busan, South Korea, Oct. 23-27, 2006.

3rd Generation Partnership Project. "3rd Generation Partnership Project; Technical Specification Group Services and System Aspects; Feasibility Study on Voice Call Continuity Support for Emergency Calls (Release 9)" 3GPP TR 23.826, V9.0.0, Mar. 2009, Sophia Antipolis Valbonne, France, pp. 1-82.

3rd Generation Partnership Project. "3rd Generation Partnership Project; Technical Specification Group Services and System Aspects; General Packet Radio Services (GPRS) enhancements for Evolved Universal Terrestrial Radio Access Network (E-UTRAN) access (Release 8)." 3GPP TS 23.401, V8.5.0, Mar. 2009, Sophia Antipolis Valbonne, France, pp. 1-223.

3rd Generation Partnership Project. "3rd Generation Partnership Project; Technical Specification Group Services and Architecture; IP Multimedia Subsystem (IMS) Service Continuity; Stage 2 (Release 8)." 3GPP TS 23.237, V8.3.0, Mar. 2009, Sophia Antipolis Valbonne, France, pp. 1-40.

3rd Generation Partnership Project. "3rd Generation Partnership Project; Technical Specification Group Services and System Aspects; Single Radio Voice Call Continuity (SRVCC); Stage 2 (Release 8)." 3GPP TS 23.216, V8.3.0, Mar. 2009, Sophia Antipolis Valbonne, France, pp. 1-33.

VoLGA Forum. "Voice over LTE via Generic Access; Stage 2 Specification; Phase 1." V.o.L.G.A. Stage 2, V0.2.0, Apr. 29, 2009, pp. 1-74.

3rd Generation Partnership Project. "3rd Generation Partnership Project; Technical Specification Group Services and System Aspects; IP Multimedia Subsystem (IMS) centralized services; Stage 2 (Release 8)." 3GPP TS 23.292, V8.3.0, Mar. 2009, Sophia Antipolis Valbonne, France, pp. 1-71.

3rd Generation Partnership Project. "3rd Generation Partnership Project; Technical Specification Group Services and System Aspects; Circuit Switched Fallback in Evolved Pack System; Stage 2 (Release 8)." 3GPP TS 23.272, V8.3.0, Mar. 2009, Sophia Antipolis Valbonne, France, pp. 1-47.

3rd Generation Partnership Project. "3rd Generation Partnership Project; Technical Specification Group Services and System Aspects; Study on Circuit Switched (CS) domain services over evolved Packet Switched (PS) access; Stage 2 (Release 9)." 3GPP TR 23.879, V9.0.0, Mar. 2009, Sophia Antipolis Valbonne, France, pp. 1-60.

* cited by examiner

METHODS AND DEVICES FOR IMPROVING SESSION CONTINUITY

TECHNICAL FIELD

The present invention relates to communication, in particular to methods and devices for improving session continuity for a terminal in a serving communication network distinct from a home communication network of the terminal.

BACKGROUND

Users typically subscribe to an operator of a communication network and are then entitled to access the operator's communication network which is also called home communication network. An operator typically has agreements with other operators having own (or shared) communication networks such that access to a terminal of the subscribed user can be provided via so-called serving communication networks operated by one or more other operators. A home communication network covers typically a certain region, e.g. country, and when a terminal moves out of the coverage of the user's home communication network it has to access a serving communication network of the same operator or another operator which is also known as roaming. A serving communication network for a roaming terminal is also called a visited communication network.

Communication technologies have been growing fast in history, however, the path of the evolution has not followed a monolithic and homogeneous technology trend. For example, mobile communication networks are currently evolving from pure circuit switched (CS) networks towards Internet protocol (IP) based networks, and by that integrate into IP based infrastructures that are also used for the Internet, the World Wide Web and the datacom industry. With this trend mobile networks closely follow the evolution steps of wireline communication networks, where Voice over IP (VoIP) via Digital Subscriber Line (DSL) access or via Wireless Local Network (WLAN) access is existing technology today.

Mobile operators that install IP Multimedia Subsystem (IMS) networks and offer IMS services want to make these services available also to mobile terminals of users having access to Global System for Mobile Communications (GSM) or Wideband Code Division Multiple Access (WCDMA) communication networks. Hereto, calls from and to this group of mobile terminals of GSM/WCDMA users are routed through the IMS network in order for the IMS service engine to execute the call and call related services. This concept of enabling IMS services when using CS access networks is called IMS Centralized Services (ICS), see also 3GPP Technical Specification 23.292 herein incorporated by reference, and is complemented by IMS Service Continuity (SC), see 3GPP Technical Specification 23.237, herein incorporated by reference, which is an IMS service supporting the use of session transfer mechanisms (also denoted nowadays as "access transfer mechanisms", e.g. see newer versions of 3GPP Technical Specification 23.237) to maintain service continuity in the event of terminal mobility and/or mobility between terminals.

IMS SC is a home communication network based IMS application which provides intra-terminal transfers of one or more components of IMS multimedia sessions across different access networks and requires a Service Centralization and Continuity (SCC) Application Server (AS) and terminals with SC capabilities.

A session as known in computer science, also known as a communication session, may be regarded as a semi-permanent interactive information exchange between communicating devices that is established at a certain time and torn down at a later time. Examples are:

TCP sessions,

Web session (HTTP sessions), using session cookies and web server session management, can be either client-side or server-side. The latter may be provided by e.g. Java Session Beans, which are web server-side components that may be either stateful or stateless, Sessions established by some session layer protocol.

Examples for a Session protocol are:

Session Description Protocol, a format for describing streaming media initialization parameters Session Initiation Protocol, a computer network protocol often used for IP telephony, and for setting up and tearing down peer-to-peer communication sessions consisting of one or several media streams A session comprises signaling data and media data and the signaling data is routed via the SCC AS. Routing the signaling data via the SCC AS is also known as anchoring. The signaling of all sessions related to a terminal are centrally anchored at the SCC AS in the home communication network in order to enable IMS SC to transfer one or more sessions of the terminal from a first access network to a second access network, e.g. from a CS access network to a packet switched (PS) access network or vice versa.

However, terminals in a serving communication network can experience a low quality of service as all session transfer requests have to be routed from the serving communication network to the home communication network where they can then be processed accordingly by the SCC AS. Long delay times as well as complex routings may worsen the service experience. For example, a voice call interruption time may increase or a data transfer may be interrupted.

SUMMARY

It is therefore an object of the invention to provide methods, devices, a system and computer programs that improve the session continuity for a terminal in a serving communication network.

According to an exemplary embodiment of the invention, a method for improving session continuity for a terminal in a serving communication network distinct from a home communication network of the terminal is provided, wherein the serving communication network comprises a session transfer node for transferring sessions each comprising signaling data and media data from a first access network of the serving communication network to a second access network of the serving communication network, the method comprising the following (performed by the session transfer node (e.g. A-SCC) in the serving communication network), routing signaling data of a session of the terminal between the first access network and the home communication network via the session transfer node in the serving communication network, receiving a session transfer request requesting the transfer of the session from the first access network to the second access network for the terminal, and transferring the session from the first access network to the second access network, and routing the signaling data of the session of the terminal between the second access network and the home communication network via the session transfer node.

According to another exemplary embodiment of the invention, a method for improving session continuity for a terminal in a serving communication network distinct from a home communication network of the terminal is provided, wherein the serving communication network comprises a session transfer node for transferring sessions each comprising signaling data and media data from a first access network of the serving communication network to a second access network of the serving communication network, the method comprising the following (performed by a node of the serving communication network), receiving an address of the session transfer node in the serving communication network, sending a session transfer request to the address of the session transfer node in the serving communication network.

According to another exemplary embodiment of the invention, a method for improving session continuity for a terminal in a serving communication network distinct from a home communication network of the terminal is provided, wherein the serving communication network comprises a session transfer node for transferring sessions each comprising signaling data and media data from a first access network of the serving communication network to a second access network of the serving communication network, the method comprising the following (performed at a session control node), determining an address of the session transfer node in the serving communication network, sending the address of the session transfer node towards a node of the serving communication network.

In the following, detailed exemplary embodiments of the present invention shall be described in order to give the skilled person a full and complete understanding. However, these embodiments are illustrative and not intended to be limiting.

DETAILED DESCRIPTION

Figure 1A:
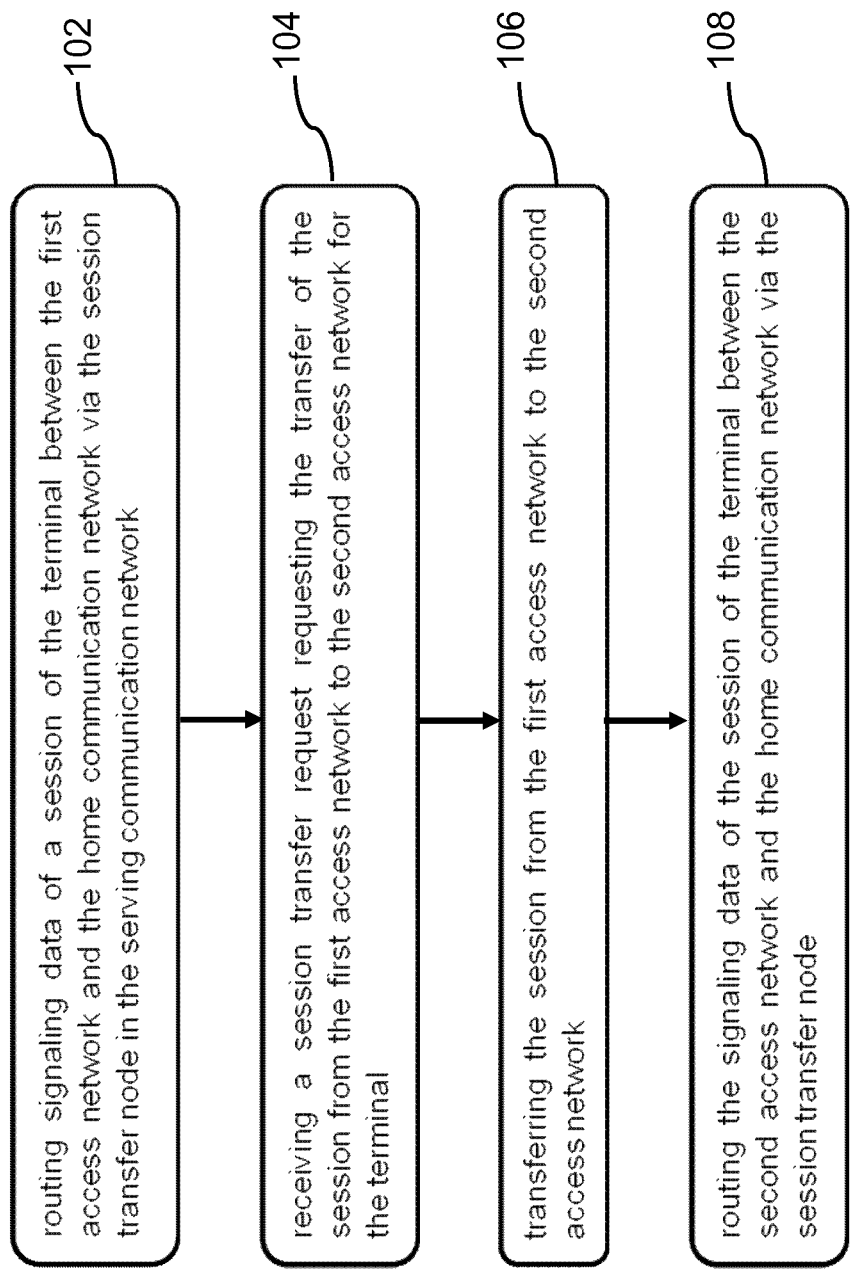
FIG. 1a illustrates a method for improving session continuity for a terminal in a serving communication network distinct from a home communication network of the terminal according to an exemplary embodiment of the invention.

The illustration in the drawing is schematic. It is noted that in FIG. 2-7, similar or identical elements are provided with the same reference signs or with reference signs, which are primed or are different from the corresponding reference signs only within the first digit.

Referring to FIG. 1a, a method for improving session continuity for a terminal in a serving communication network distinct from a home communication network of the terminal according to an exemplary embodiment of the invention is illustrated. The serving communication network comprises a session transfer node for transferring sessions each comprising signaling data and media data from a first access network of the serving communication network to a second access network of the serving communication network. The method comprises the following: As indicated by a block 102, signaling data of a session of the terminal is routed between the first access network and the home communication network via the session transfer node in the serving communication network. As indicated by a block 104, a session transfer request is received. The session transfer request requests the transfer of the session from the first access network to the second access network for the terminal. As indicated by a block 106, the session is transferred from the first access network to the second access network. As indicated by a block 108, the signaling data of the session of the terminal is routed between the second access network and the home communication network via the session transfer node.

The method may be performed by the session transfer node in the serving communication network which may be adapted as e.g. an "Assisted Service Centralization and Continuity (A-SCC))" node.

In the context of this application, the term "transferring a session from a first access network to a second access network" may particularly denote transferring signaling data and media data from the first access network to the second access network. A routing of data of a session before, during and after the transfer of the session via the same node may be denoted as anchoring, e.g. the signaling data of a session may be anchored at a session transfer node and the media data of the same session may be anchored at the session transfer node or at a node interfacing the session transfer node.

The term "access network" may particularly denote any communication network to which a terminal may attach to for communicating with a remote end. In particular, in the context this application, an access network may comprise nodes of a radio and core network.

In particularly, the terminal may belong to a communication network and thus being referred to as a node.

Figure 1B:
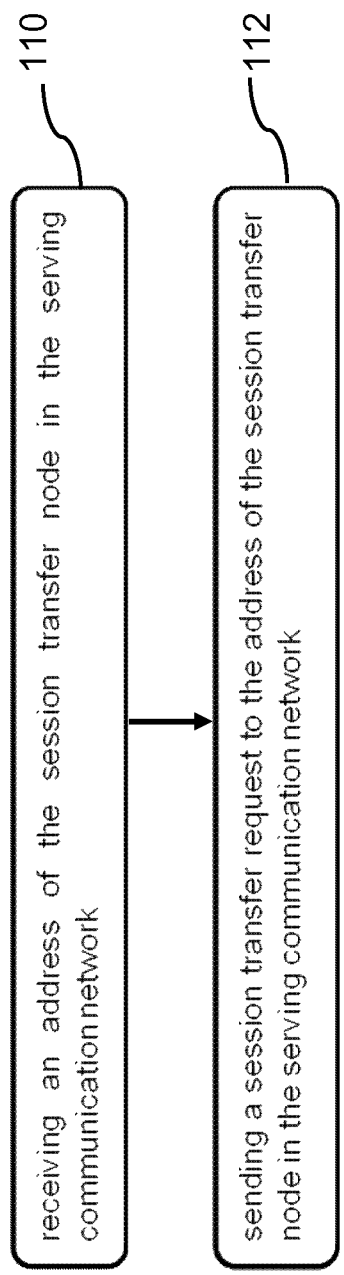
FIG. 1b illustrates a method for improving session continuity for a terminal in a serving communication network distinct from a home communication network of the terminal according to another exemplary embodiment of the invention.

Referring to FIG. 1b, a method for improving session continuity for a terminal in a serving communication network distinct from a home communication network of the terminal according to another exemplary embodiment of the invention is illustrated. The serving communication network comprises a session transfer node for transferring sessions each comprising signaling data and media data from a first access network of the serving communication network to a second access network of the serving communication network. The method comprises the following: As indicated by a block 110, an address of the session transfer node in the serving communication network is received, and, as indicated by a block 112, a session transfer request is sent to the address of the session transfer node in the serving communication network.

In particular, the method may be performed by a node of the serving communication network.

In particular, in the context of this application, the term "receiving an address of the session transfer node" may particularly denote any (particularly directly or indirectly) receiving of information related to the address of the session transfer node. In particular, the address of the session transfer node may be received via further nodes of the serving communication system.

In particular, in the context of this application, the term "sending a session transfer request to the address of the session transfer node" may particularly denote any (particularly directly or indirectly) sending of a session transfer request towards the session transfer node. In particular, the session transfer request may be sent via further nodes of the serving communication system.

In particular, the node of the serving communication system may be a node of the first access system of the serving communication system (e.g. in case of a packet switched (PS) access network a Proxy Call/Session Control Function (P-CSCF) or a Mobility Management Entity (MME)), a node of the second access system of the serving communication system (e.g. in case of a circuit switched (CS) access network a Mobile Switching center Server (MSC-S)), or the terminal (which may belong to the serving communication network).

Accordingly, the address may be received as a local STN-SR or other suitable address information, may be received in a re-attach indication, or may be received in a relocation or handover indication.

In particular, the session transfer request may be a handover request (message).

Figure 1C:
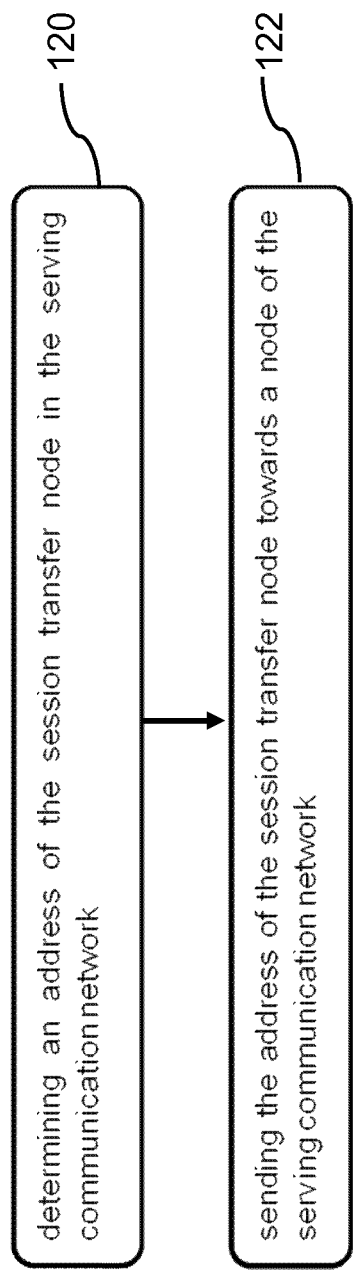
FIG. 1c illustrates a method for improving session continuity for a terminal in a serving communication network distinct from a home communication network of the terminal according to another exemplary embodiment of the invention.

Referring to FIG. 1c, a method for improving session continuity for a terminal in a serving communication network distinct from a home communication network of the terminal according to another exemplary embodiment of the invention is illustrated. The serving communication network comprises a session transfer node for transferring sessions each comprising signaling data and media data from a first access network of the serving communication network to a second access network of the serving communication network. The method comprises the following: As indicated by a block 120, an address of the session transfer node in the serving communication network is determined, and, as indicated by a block 122, the address of the session transfer node is sent towards a node of the serving communication network.

The method may be performed at (or by) a session control node.

In particular, the session control node may be part of or located in the serving communication network or in the home communication network. In particular, the session control node may be adapted as a Proxy Call/Session Control Function (P-CSCF).

In the context of this application, the term "determining and/or sending an address of the session transfer node" may particularly denote determining and/or sending (information about) a signaling anchor (point) of the serving communication network.

The term "anchoring a session in a node" may particularly denote that signaling and/or media data may be routed through this node at any time, for instance before, during and after a session transfer. In particular, the session may be controlled by this node at any time.

Accordingly, a session transfer node is adapted to perform a method for improving session continuity for a terminal in a serving communication network distinct from a home communication network of the terminal as explained above with reference to FIG. 1a.

Accordingly a node of the serving communication is adapted to perform a method for improving session continuity for a terminal in a serving communication network distinct from a home communication network of the terminal as explained above with reference to FIG. 1b.

Accordingly, a session control node is adapted to perform a method for improving session continuity for a terminal in a serving communication network distinct from a home communication network of the terminal as explained above with reference to FIG. 1c.

A system comprises a session transfer node as explained above, a node of a serving communication network as explained above, and a session control node as explained above.

A computer program loadable into a processing unit of a session transfer node comprises code adapted to perform the method for improving session continuity for a terminal in a serving communication network distinct from a home communication network of the terminal as explained above with respect to FIG. 1a when operated at the session transfer node.

A computer program loadable into a processing unit of a node of a serving communication network comprises code adapted to perform the method for improving session continuity for a terminal in a serving communication network distinct from a home communication network of the terminal as explained above with respect to FIG. 1b when operated at the node of the serving communication network.

A computer program loadable into a processing unit of a session control node comprises code adapted to perform the method for improving session continuity for a terminal in a serving communication network distinct from a home communication network of the terminal as explained above with respect to FIG. 1c when operated at the session control node.

A computer-readable medium product comprises a computer program as explained above.

Next, further exemplary embodiments of the method for improving session continuity for a terminal in a serving communication network distinct from a home communication network of the terminal as explained above with reference to FIG. 1a will be explained. However, these embodiments also apply to the respective session transfer node, the respective system, the respective computer program, and the respective computer-readable medium.

The session transfer request may comprise terminal identity information, wherein the method may further comprise analyzing the terminal identity information for determining the session of the terminal that may be to be transferred.

The session transfer request may further comprise session transfer request identification information, wherein the method may further comprise determining if any of the received information may be in accordance with an available policy, and transferring the session according to a result of the according determination.

The method may further comprise sending a message to a session transfer node in the home communication network for indicating to the home communication network session transfer node that the serving communication network session transfer node may be responsible for the routing of the signaling data and the transferring of the session. In particular, the session transfer node of the home communication network may be adapted as a Service Centralization and Continuity Application Server (SCC AS), wherein the message sent to the session transfer node of the home communication network may be based on a Session Initiation Protocol (SIP) and may comprise a flag or an indication indicating that the session transfer node of the serving communication network may be included in the signaling routing path. Thus, the home communication network, particularly the session transfer node of the home communication network, may be adapted to disable session transfer related functionality in the home communication network, if present in the home communication network.

The media data may be transferred from the first access network to the second access network along with the signaling data.

The media data may be anchored at a node in the serving communication network interfacing the session transfer node, particularly in a media handling node (e.g. a Media Resource Function Processor MRFP).

Next, further exemplary embodiments of the method for improving session continuity for a terminal in a serving communication network distinct from a home communication network of the terminal as explained above with reference to FIG. 1b will be explained. However, these embodiments also apply to the respective node of a serving communication network, the respective system, the respective computer program, and the respective computer-readable medium.

The method may further comprise receiving a message requesting the session transfer, and sending in response to the reception of the message the session transfer request.

In particular, the message requesting the session transfer may comprise the address of the session transfer node of the serving communication network. In particular, the session transfer request may be a handover request (message). In particular, a node of the second access network may receive the address of the session transfer node (particularly from a node of the first access network) and may send the session transfer request to the session transfer node. The node of the first and/or second access networks may be adapted as service mobility nodes, e.g. a MME, a SGSN, and a MSC-S.

Next, further exemplary embodiments of the method for improving session continuity for a terminal in a serving communication network distinct from a home communication network of the terminal as explained above with reference to FIG. 1c will be explained. However, these embodiments also apply to the respective session control node, the respective system, the respective computer program, and the respective computer-readable medium.

The session transfer node in the serving communication network may be determined by a session transfer node in the home communication network, wherein the method may further comprise receiving an indication of the selected session transfer node in the serving communication network, and determining the address of the session transfer node from the received indication. In particular, a session transfer node of the home communication network may be adapted as a SCC AC which may particularly determine the address of the session transfer node by selecting the address from a list comprising information about (local-configured) session transfer nodes (e.g. A-SCCs) for each serving (also called sometimes "visited" in case of roaming) communication network. Alternatively or in addition, the session transfer node of the home communication network may determine the address of the session transfer node by deriving an address (string) (e.g. a Uniform Address Identifier (URI)) of the session transfer node to be selected based on information about the serving communication network, wherein the information may be stored or may be available in the session transfer node of the home communication network. In particular, the serving communication network may then select the session transfer node based on the received indication. In particular, the session control node may form part of the home communication network. In particular, the session control node may be adapted as a P-CSCF in the home communication network.

The session control node may be a node of the serving communication network and may determine the session transfer node. In particular, the session transfer node may be co-located with the session control node, whereby no explicit determination or selection of the session transfer node may be necessary. In particular, the session transfer node and the session control node may be separate nodes such that the session transfer node may be (particularly explicitly) determined or selected by the session control node. In particularly, in both latter cases, the session control node may be adapted as a P-CSCF. In particular, as mentioned above, a session transfer node of the home communication network may determine or select the session transfer node of the serving communication system and may send a respective indication or respective information to the session control node which may in turn determine or select the session transfer node.

The address of the session transfer node may be sent from the session control node to the terminal for the sending of the address of the session transfer node to the node of the serving communication network.

The terminal may further send the address of the session transfer node to a serving mobility node (e.g. a MME or a Serving GPRS Support Node (SGSN)) to which the terminal may be attached to in the serving communication network for the sending of the address of the session transfer node to the node of the serving communication network. In particular, the terminal may send the address when performing a re-attach to the serving communication network, particularly to the first access network of the serving communication network.

The serving mobility node may send the address to the node of the serving communication network for the sending of the address of the session transfer node to the node of the serving communication network. In particular, the serving mobility node may include the address of the session transfer node in a relocation request, particularly a handover request, sent to a serving mobility node of the second access network of the serving communication system.

The method may further comprise receiving from the terminal at least one parameter comprising information about an identity of a subscriber operating the terminal (e.g. an International Mobility Subscriber Identification (IMSI)), a location of the terminal (e.g. Tracking Area (TA)), and an identity of a serving mobility node the terminal may be attached to in the serving communication network (e.g. a Global Unique Temporary Identity (GUTI)), and determining the session transfer node from the received at least one parameter. In particular, the at least one parameter, particularly the GUTI and the TA, may be allocated by the serving mobility node of the first access network of the serving communication system, particularly by the MME. In particular, determining the session transfer node from the received at least one parameter may comprise selecting the session transfer node (particularly as a signaling anchor point) using table mapping of the at least one parameter, particularly the GUTI and the TA information, to session transfer nodes, particularly to A-SCC instances.

The address of the session transfer node may be sent to the serving mobility node (e.g. a Mobility Management Entity (MME), a Serving GPRS Support Node (SGSN) and/or Handover Selection Function (HOSF)) for the sending of the address of the session transfer node to the node of the serving communication network. In particular, an address of the serving mobility node to which the address of the session transfer node may have to be sent may be determined by the session control node particularly by using the at least one parameter (e.g. the TA information and the GUTI) received from the terminal. In particular, in case the terminal may attach to another serving mobility node and thus may send at least one another (updated) parameter, the sending of the (updated) address of the session transfer node to the another serving mobility node may have to be repeated accordingly. In particular, the service mobility node may send the address to another service mobility node particularly of the same or a different access network. In case of a PS first access network and a CS second access network the serving mobility node may be adapted as a MME or a HOSF co-located in or with the MME or separate from the MME, wherein the address may be sent to the MME which in turn may inform the HOSF of the address to enable to contact the respective MSC-S. In the context of this application, a "Handover Selection Function (HOSF)" may particularly denote a functionality required by the serving mobility node for selecting the handover support functionality.

Next, further exemplary embodiments of the session transfer node, the node of a serving communication network, and the session control node as explained above will be explained. However, these embodiments also apply to the respective methods for improving session continuity for a terminal in a serving communication network distinct from a home communication network of the terminal, the respective system, the respective computer program, and the respective computer-readable medium.

In particular, the session transfer node may be a standalone functionality or may be co-located with a particularly SIP-capable network entity like a P-CSCF, a MSC-S (particularly of the second access network of the serving communication network) or an IMS Border Control Function (IBCF)

Each of the nodes may comprise a receiving unit, a transmission unit, a processing unit, and a storage unit.

The method for improving session continuity for a terminal in a serving communication network distinct from a home communication network of the terminal may comprise routing media data of a session of the terminal between the first access network and the home communication network via a media handling node in the serving communication network before the session transfer and routing media data of a session of the terminal between the second access network and the home communication network via the media handling node in the serving communication network after the session transfer.

In particular, the media data may be anchored in the media handling node in the serving communication system, such that the media data may be routed or passed through the media handling node before, during and after a session transfer from a first access network of the serving communication network to a second access network of the serving communication network.

In particular, the media handling node may be adapted as a Media Resource Function Processor (MRFP).

In particular, the media handling node may be adapted as a separate node with respect to the session transfer node. In particular, the media handling node may have an interface with the session transfer node.

In particular, the media handling node may be controlled by the session transfer node in the serving communication network. The session transfer node may control the media handling node via an interface (such as particularly depicted in FIG. 3-6 a session transfer node A-SCC 308 controlling a media handling node MRFP 338 via an interface 344).

Figure 2A:
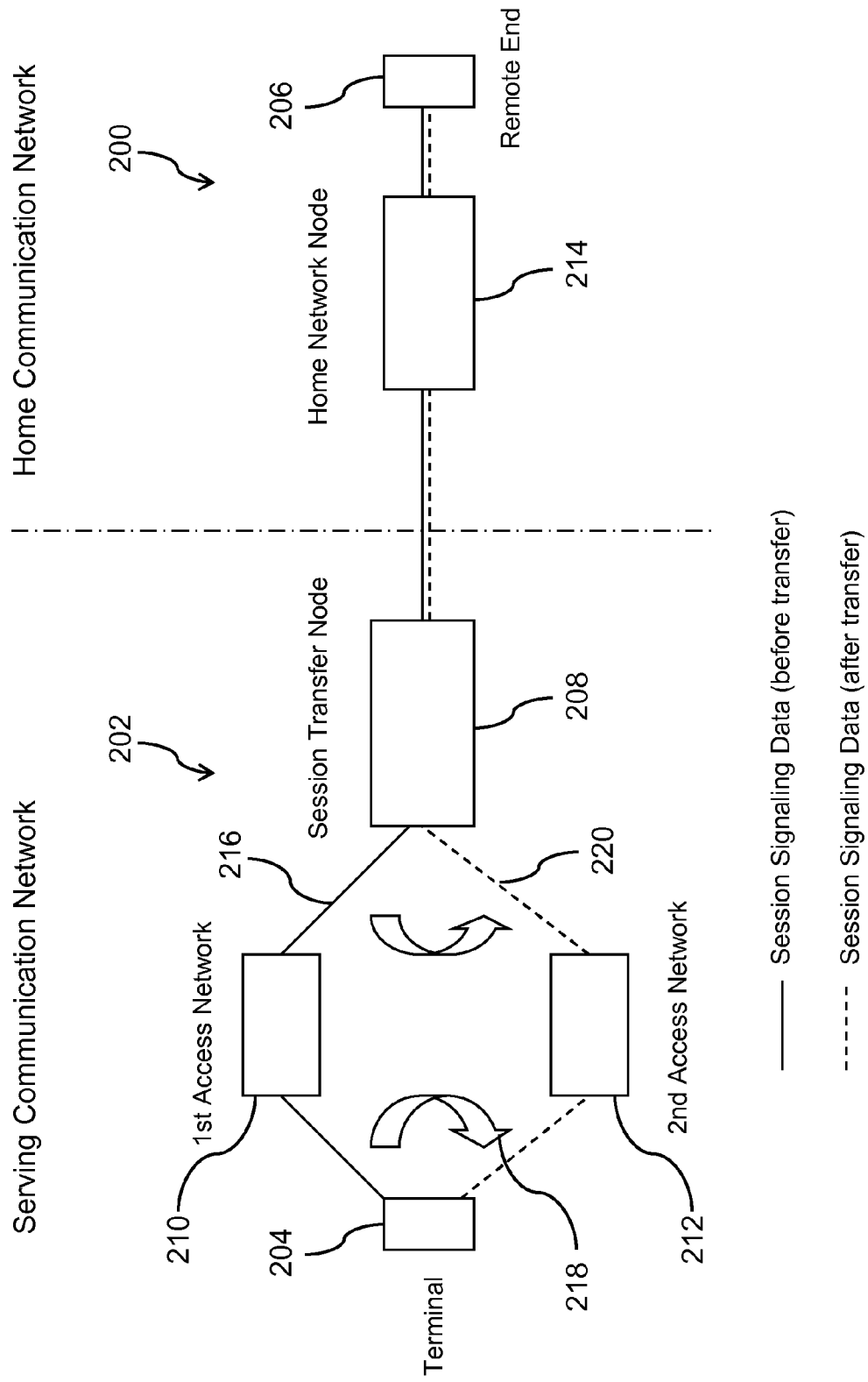
FIG. 2a illustrates a transfer of signaling data of a session according to an exemplary embodiment of the invention.

FIG. 2*a* depicts a home communication network 200 and a serving communication network 202. A terminal 204 of the home communication network 200 communicates via the serving communication network 202 through the home communication network 200 with a remote end 206, i.e. the terminal 204 and the remote end 206 can exchange signaling data and media data in a session. A remote end may 206 be e.g. a second terminal or a server and it can reside either in the home communication network 200 or any other network connected to the world wide telecommunication network. The session, i.e. its signaling part, is anchored in a session transfer node 208 in the serving communication network 202. As such, fast and reliable transfers of the session from a first access network 210 to a second access network 212 (and back or to a third access network not shown in FIG. 2*a*) may be achieved.

In a first period (denoted by "before the transfer"), the signaling data is routed along a communication path (indicated by a solid line 216) via the first access network 210 and via the session transfer node 208 (where the session is anchored) in the serving communication network 202 and a home communication network node 214. The session can be transferred by the session transfer node 208 in the serving communication network 202 from the first access network 210 to the second access network 212 as indicated by the arrows 218. In a second period following the transfer (denoted by "after the transfer), the signaling data is routed along a communication path (indicated by a dashed line 220) via the second access network 212 and via the session transfer node 208 (where the session is anchored) in the serving communication network 202 and the home communication network node 214 or one or more alternative home communication network nodes not shown in FIG. 1*a*.

Hence, the signaling data of the session of the terminal 204 is routed via the session transfer node 208 in the serving communication network 202 before, during, and after the transfer of the session such that the session transfer node 208 stays in control of the transfer at any time, i.e. the session is anchored at the session transfer node 208 in the serving communication network 202 before, during and after the transfer.

The transfer of the session from the first access network 210 to the second access network 212 may be triggered by receiving a session transfer request requesting the transfer of the session from the first access network 210 to the second access network 212 for the terminal 204.

Figure 2B:
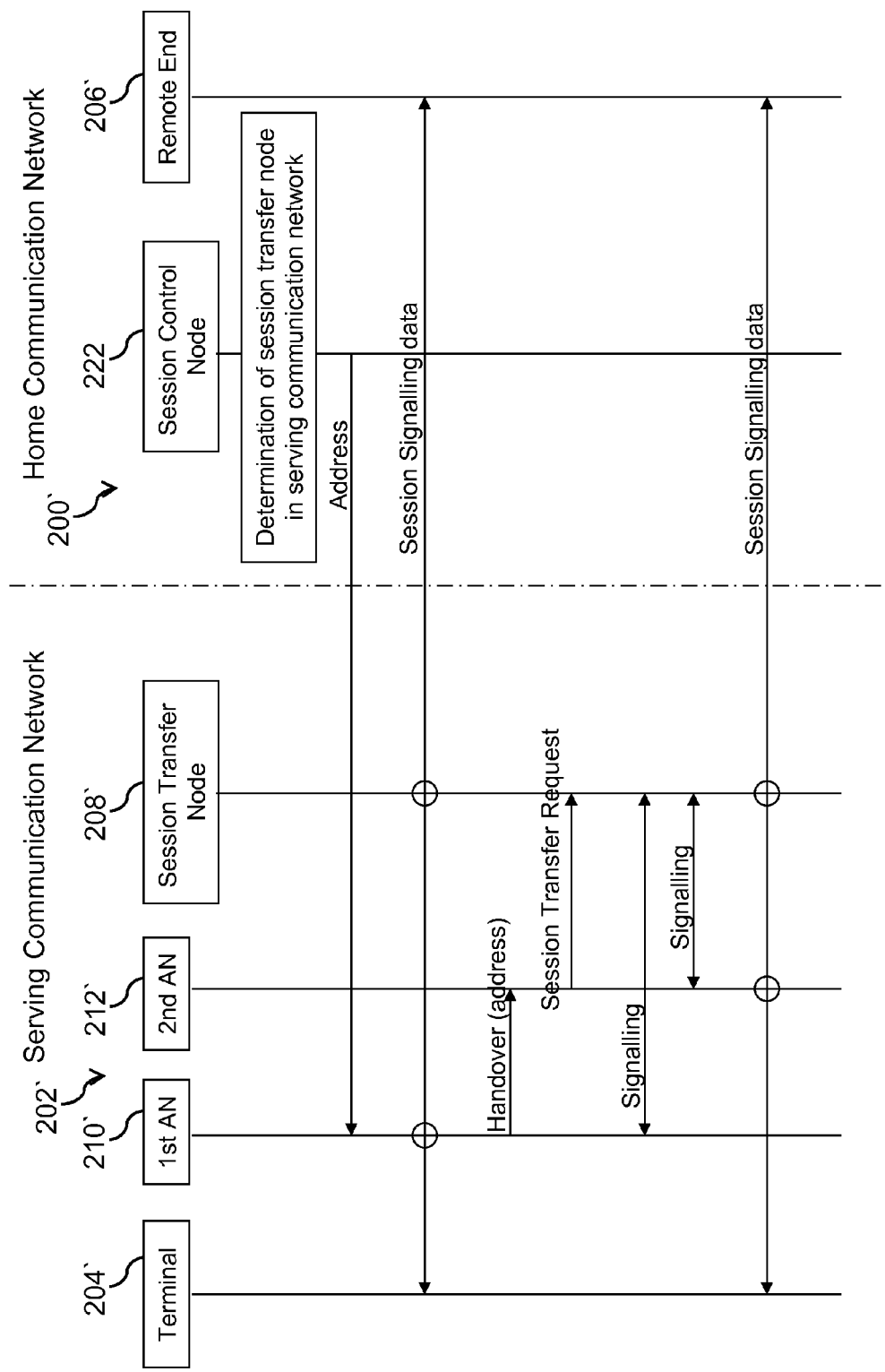
FIG. 2b illustrates a signaling exchange diagram for a transfer of signaling data of a session according to an exemplary embodiment of the invention.

FIG. 2*b* depicts a signaling exchange diagram in a communication network. For reasons of illustration, FIG. 2*a* and FIG. 2*b* do not describe the invention on node-level regarding the first access network 210, 210' and the second access network 212, 212', however, it is evident that messages, requests, information exchange, signaling etc can be communicated between nodes of the first access network 210, 210' and second access network 212, 212' (i.e. on node-level) and the other entities such as the terminal 204, 204', the session transfer node 208, 208' or a session control node 222 as depicted.

The first access network 210' (1st AN), the second access network 212' (2nd AN) and the session transfer node 208' are part of a serving communication network 202'. The session control node 222 can be part of the home communication network 200' as depicted in FIG. 2b but alternatively or in addition part of the serving communication network 202' as described in more detail in conjunction with FIGS. 5 and 6.

The session control node 222 determines the session transfer node 208' in the serving communication network 204', e.g. by looking up an appropriate session transfer node 208' from a table or by performing a communication with the session transfer node 208' (e.g. negotiation) not depicted in FIG. 2b, and sends an address of the determined session transfer node 208' to the first access network 210' to enable the first access network 210' to initiate any session transfer request to the session transfer node 208'. The address of the session transfer node 208' may be received at the first access 210' network during the establishment of the session indicating the anchoring of the session at the session transfer node 208' to the first access network 210'. Examples for the determination and sending are provided in more detail in conjunction with FIGS. 5 and 6.

A session between a terminal 204' and a remote end 206' is executed. The signaling data of the session between the terminal 204' and the remote end 206' is routed via the first access network 210' (circled) and the session transfer node 208' (circled) and typically one or more further nodes not shown here.

A handover request is sent from the first access network 210' to the second access network 212'. The handover request comprises the address of the session transfer node 208' as determined by the session control node 222. At reception of the handover request, the second access network 212' sends the session transfer request to the provided address of the session transfer node 208' for requesting the session to be transferred from the first access network 210' to the second access network 212'. The session transfer node 208' may signal instruction messages to the first access network 210' and the second access network 212' for instructing those networks 210', 212' regarding the transfer (as well to one or more further nodes not shown here for simplicity). Subsequent to the transfer, the signaling data of the session is routed via the second access network 212' (circled) and via the session transfer node 208' (circled).

The media data of the session is not depicted in FIGS. 2a and 2b. The media data is typically also transferred from the first access network 210, 210' to the second access network 212' along with the session signaling data. The media data and the signaling data of the session may be routed via the same nodes and/or via different nodes that may be e.g. better adapted to the processing and routing of the respective data types.

Figure 3:
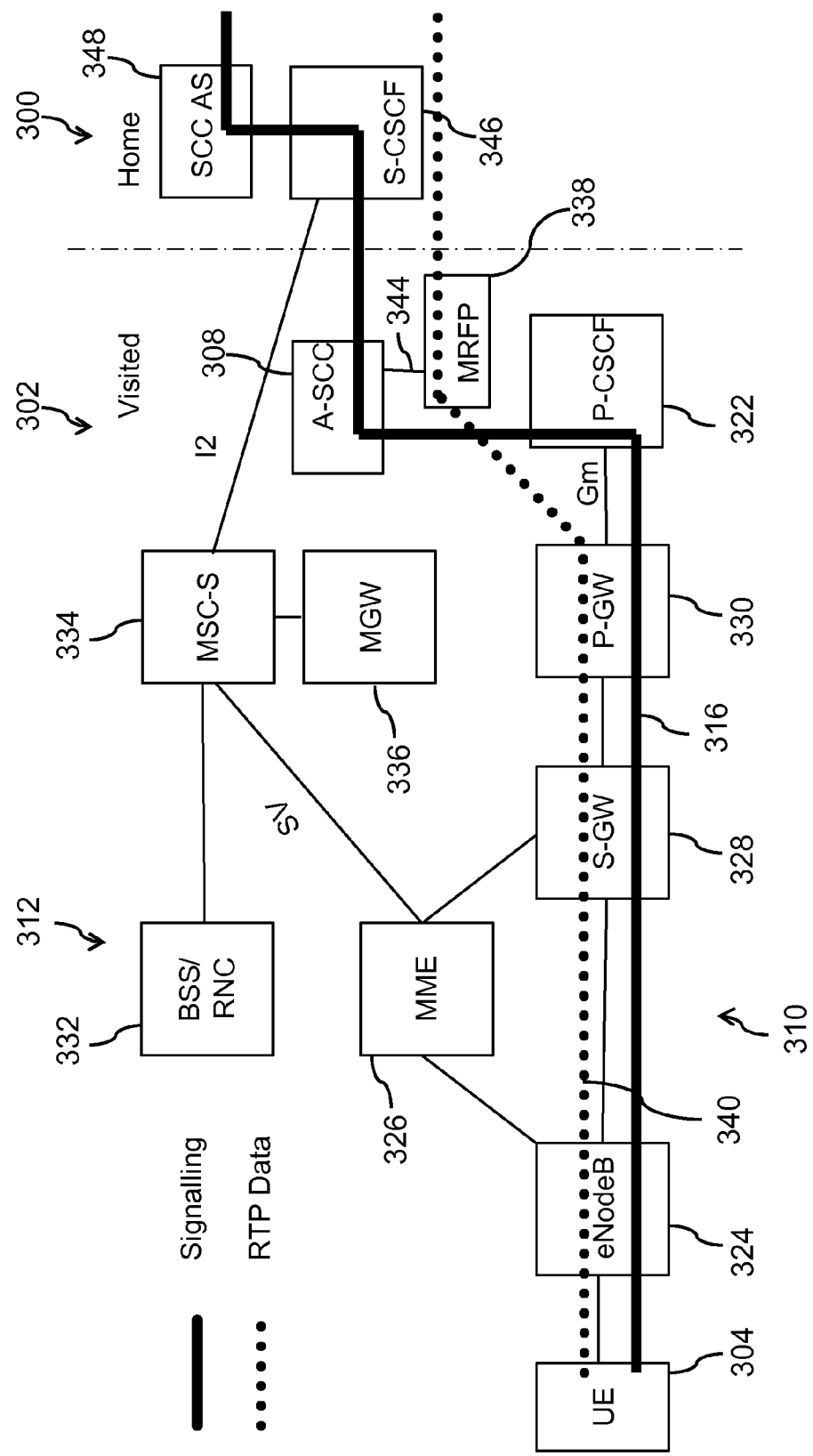
FIG. 3 illustrates a first exemplary embodiment for routing of signaling data and media data in a communication network according to the invention.
Figure 4:
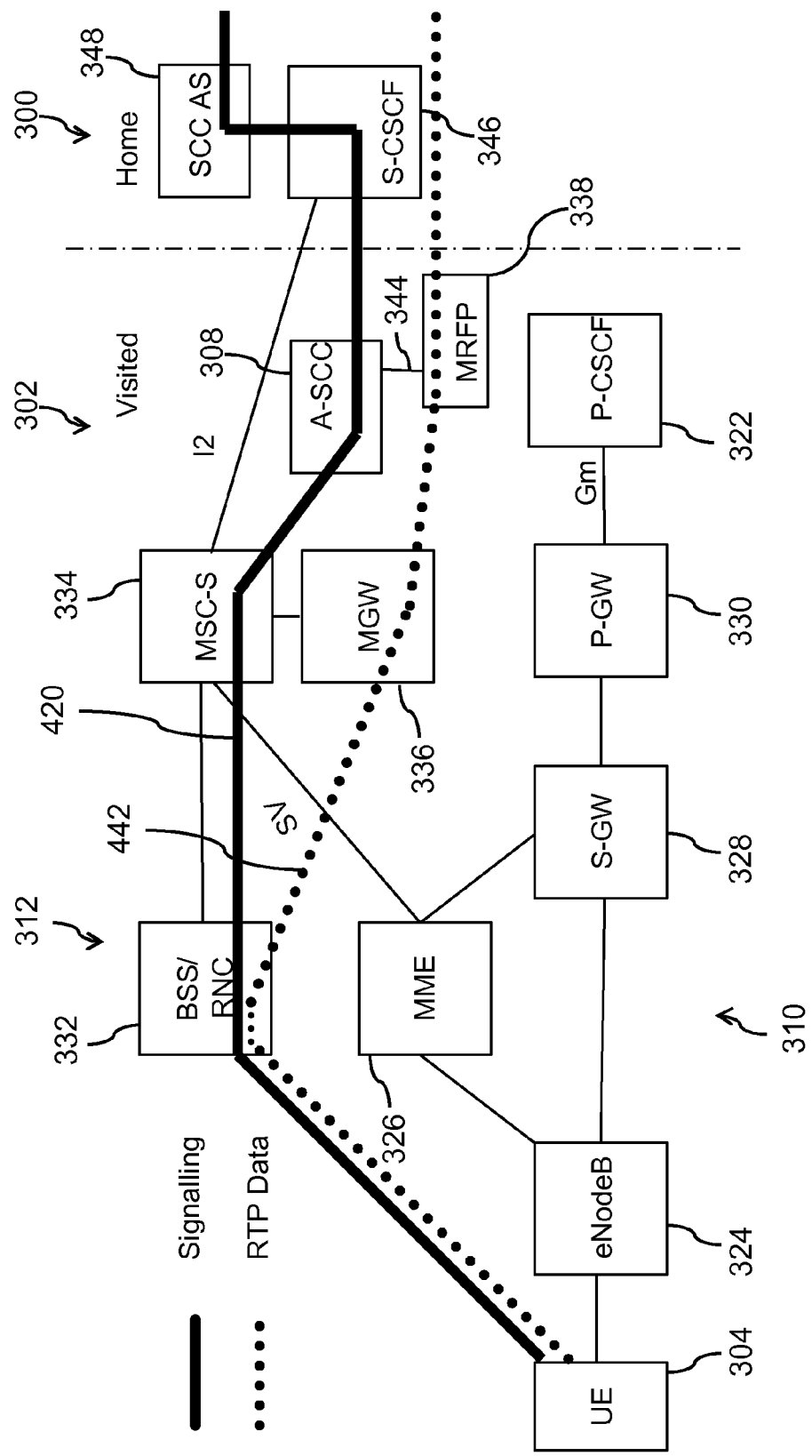
FIG. 4 illustrates a second exemplary embodiment for routing of signaling data and media data in a communication network according to the invention.

An exemplary embodiment for a routing of media data and signaling data of a session is depicted in FIGS. 3 and 4 before and after the transfer of the session by a session transfer node 308 which is denoted by "Assisted"-SCC or A-SCC.

FIGS. 3 and 4 (as well as the following figures) describe exemplary embodiments of the invention on a node-level regarding the first access network 310 and the second access network 312. The first access network 310 according to FIG. 3-6 is a PS network comprising an eNodeB (eNB) 324, a Mobility Management entity (MME) 326, a Serving Gateway (S-GW) 328, a Packet Gateway (P-GW) 330 or a Packet-Data Network Gateway (PDN GW), a Proxy Call/Session Control Function (P-CSCF) 322, and the second access network 312 is a CS network comprising a Base Station Subsystem/Radio Network Controller (BSS/RNC) 332, a Mobility Switching Centre Server (MSC-S) 334, and a Media Gateway (MGW) 336. An A-SCC 308 and a Media Resource Function Processor (MRFP) 338 anchor signaling data 316, 420 and media data 340, 442 respectively and cannot be attributed to any of the first access network 310 and the second access network 312.

The A-SCC 308 may comprise the functionality of a session transfer node, and the P-CSCF 322 may comprise the functionality of a session control node. The A-SCC 308 and the MRFP 338 may interface each other via an interface 344.

The BSS/RNC 332, the MSC-S 334, and the MGW 336 may form part of the Universal Mobile Telecommunications System (UMTS). The RNC 332 may form part of the UMTS Terrestrial Ran Network (UTRAN) which may comprise a Node B (NB).

FIG. 3 and FIG. 4 show a terminal (UE) 304 exchanging signaling data ("signaling", bold solid line 316, 420) and media data ("RTP (Real time Transport Protocol) Data", bold dotted line 340, 442) with a remote end at the side of the home communication network 300 ("Home", the remote end is not shown, the bold dotted lines 340, 442 and solid lines 316, 420 may extend via several further nodes to the remote end, also the said several further nodes are not shown for simplicity). The UE 304 is roaming in the serving communication network 302 which is called visited communication network ("Visited") for this reason.

According to FIG. 3, the UE 304 is attached via a PS (e.g. E-UTRAN) access network 310 and the signaling data 316 is routed via the eNodeB 324, the S-GW 328, the P-GW 330, the P-CSCF 322, the session (signaling data) anchoring A-SCC 308 to nodes in the home network 300 which are here a S-CSCF 346 and a SCC AS 348 and possible further nodes to the remote end. The media data 340 is routed via the same eNodeB 324, S-GW 328, and P-GW 330 to a MRFP 338 to one or more nodes (not shown) of the home communication network 300 to the remote end.

FIG. 4 shows the routing of the signaling data 420 and media data 442 after the transfer from the PS access network 310 to the CS access network 312. Signaling data 420 is routed via the BSS/RNC 332, the MSC-S 334 and via the same A-SCC 308 as before the transfer. The media data 442 is routed via the BSS/RNC 332 to a MGW 336 and the same MRFP 338 as before the transfer. According to the exemplary embodiment, the signaling data 420 and the media data 442 are further routed via the same nodes 348 in the home network 300 as before the transfer.

The A-SCC 308 is a new function in the serving (visited if roaming) network 302. It primarily provides IMS-based mechanisms for enabling service continuity of multimedia sessions. For IMS Service Continuity and in particular for Session (nowadays also called "Access") Transfer as defined in 3GPP Technical Specification 23.237, the A-SCC 308 may implement one or more of the following functionalities:

The A-SCC 308 is included into the SIP routing path. Both originated and terminated sessions are passed through. This implies also session transfer requests are terminated at the A-SCC 308.

It analyzes the information required for Session Transfer included in the SIP INVITE (an example for a session transfer request comprising session transfer request identification information allowing to identify that the received SIP invite is indeed a session transfer request and further including terminal identity information) and decides which Session Transfer scenario should be executed; it rejects the Session Transfer request if it is not aligned with the operator policy (if operator policy is present in the A-SCC 308).*

It may retrieve from the HSS or from the SCC AS 348 the Correlation Mobile Station International ISDN Number (C-MSISDN) bound to the IMS Private User Identity stored in the user profile in the HSS. If a session on the PS access is anchored in the SCC AS 348, the SCC AS 348 knows that for the IMS Private User Identity used during registration a session is ongoing.

The A-SCC 308 indicates to the home IMS by a flag/indication in a SIP message that it has been included into the routing path. This allows the home communication network 300 to disable session transfer related functionality, if present, in the home communication network 300.

It correlates the Session Transfer request with the anchored session, using information provided in the incoming SIP INVITE (see also bullet with "*" above, e.g. by analyzing received terminal identity information). If the session transfer request includes the C-MSISDN, the SCC AS 348 can look up the corresponding session on the PS access which shall be transferred.

It provides Session Transfer specific charging data.

It controls an MRFP 338 for media manipulation.

The A-SCC 308 may behave as a Back-to-Back user Agent (B2BUA) (both signaling and media) to hide the change from the remote end.

The A-SCC 308 can be standalone or co-located with a SIP-capable network entity like the P-CSCF 322, the MSC-S 334 or an IMS Border Control Function (IBCF).

The A-SCC 308 can execute the Access Transfer procedure by replacing the Source Access Leg (e.g. via an Evolved Universal Terrestrial Radio Access Network (E-UTRAN)) currently communicating to the Remote Leg with the Target Access Leg (via a MSC Server 334). It can do so by looking up an existing session that correlates to the access transfer request (using the C-MSISDN as specified in 3GPP Technical Specification 23.237), and replacing the Source Access Leg with the Target Access Leg. If no media flow is retained in the transferred-out access, the Source Access Leg is released and the A-SCC 308 updates the Remote Leg if necessary. When the switch of the Source Access Leg to the Target Access Leg is executed, the Remote Leg is typically also updated in order to forward the media flow(s) to the transferred-in Access Network.

After the transfer, e.g. to CS, the signaling 420 is routed via the A-SCC 308 and the media 442 via the MRFP 338.

If the A-SCC 308 is placed in the visited network 302, then the SCC AS 348 in the Home Public Land Mobile Network (HPLMN)/home IMS provides terminating Access Domain Selection (T-ADS) as specified in the 3GPP Technical Specification 23.237. In addition, the SCC AS 348 may handle operator policies and Inter-UE Transfer.

Because the A-SCC 308 is included into the routing plane, it needs to be selected for originated and terminated sessions.

session Transfer request from the MSC Server enhanced for SRVCC needs to be routed to it.

Hence, there is a need to determine a session transfer node in a serving communication network and to communicate an address of the determined session transfer node to a node in the serving communication network that is adapted to trigger a sending of a session transfer request for transferring the session from a first access network to a second access network.

In the following, exemplary embodiments are described in the context of FIGS. 5 and 6 regarding a determination of a session transfer node 308 in a serving communication network 302 for a session of a terminal 304 of a home communication network 300 and methods for providing an address of the determined session transfer node 308 to a node 304, 322, 326, 334, 626, 650 of the serving communication network 302 for a session transfer request to be sent to the determined session transfer node 308. It is noted that for simplification elements in FIG. 5, 6 referring to similar or identical elements in FIG. 3, 4 are provided with the same reference signs.

Figure 5:
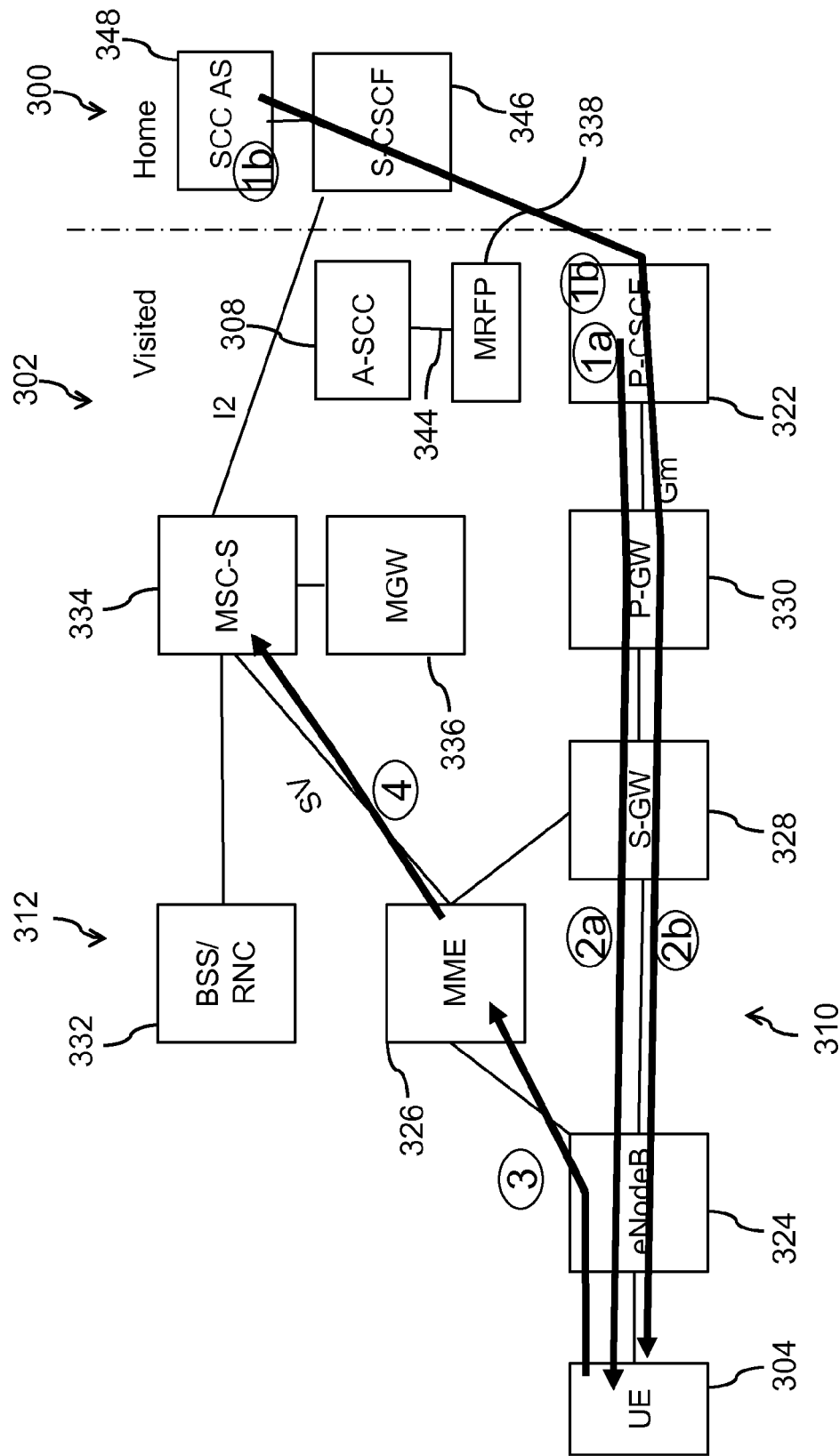
FIG. 5 illustrates a first exemplary embodiment for determining a session transfer node in a serving communication network and providing an address of the session transfer node to a node in the serving communication network according to the invention.

There may be different options on how to determine an A-SCC 308 in the visited network 302 and how to provide the address of the A-SCC 308 to the MSC Server 334:

According to a first option according to FIG. 5 for which a P-CSCF 322 is in the serving (visited if roaming) network 302, the following may be executed:

1) As a first step, a network determines a signaling anchor (A-SCC 308) in the serving (visited if roaming) network 302. This can be performed e.g. in one of the two following ways:

1a) The A-SCC 308 is co-located in the P-CSCF 322 in the visited network 302, which controls a MRFP 338; In this case there is no need to select the A-SCC 308 explicitly.

1b) In case the A-SCC 308 is separate from the P-CSCF 322, it is:

selected by the P-CSCF 322 using some local algorithm to the visited network 302 (e.g., round robin, based on a hash of user ID etc) and/or selected/addressed by a SCC AS 348 in the home network 300. In this case the SCC AS 348 may address the A-SCC 308 based on a number of principles, e.g., it has a list of local-configured A-SCC 308 for each visited network 302 it selects from, it can derive a A-SCC User Roaming Number (URI) based on the visited network information it has (and the visited network 302 will in the end select the physical A-SCC 308 itself), etc. Note that in this case the P-CSCF 322 can also be in the home network 300.

2) As a further step, a) the P-CSCF 322 (in case the P-CSCF 322 selected the A-SCC 308) or b) the SCC AS 348 (in case the SCC AS 348 invoked the A-SCC 308) informs the UE 304 about the selected signaling anchor/address of A-SCC 308, using either:

a local Session Transfer Number Single Radio (STN-SR, which is an example for an address of a session transfer node 308) to route the call from the MSC Server 334 or the UE 304 to the A-SCC 308, or other address.

A STN-SR is an example for an address of a session transfer node 308. Note that the address that is determined by the session control node and sent to the node of the serving communication network does not need to be identical with the address that is used to send the session transfer request to the session transfer node as address translation can be performed.

3) As a further step, the UE 304 sends address of an A-SCC 308 to the MME 326, e.g. by performing a re-attach.

4) As a further step, the MME 326 includes an address of the A-SCC 308 in a relocation request sent to the MSC Server 334 over a SV interface.

Figure 6:
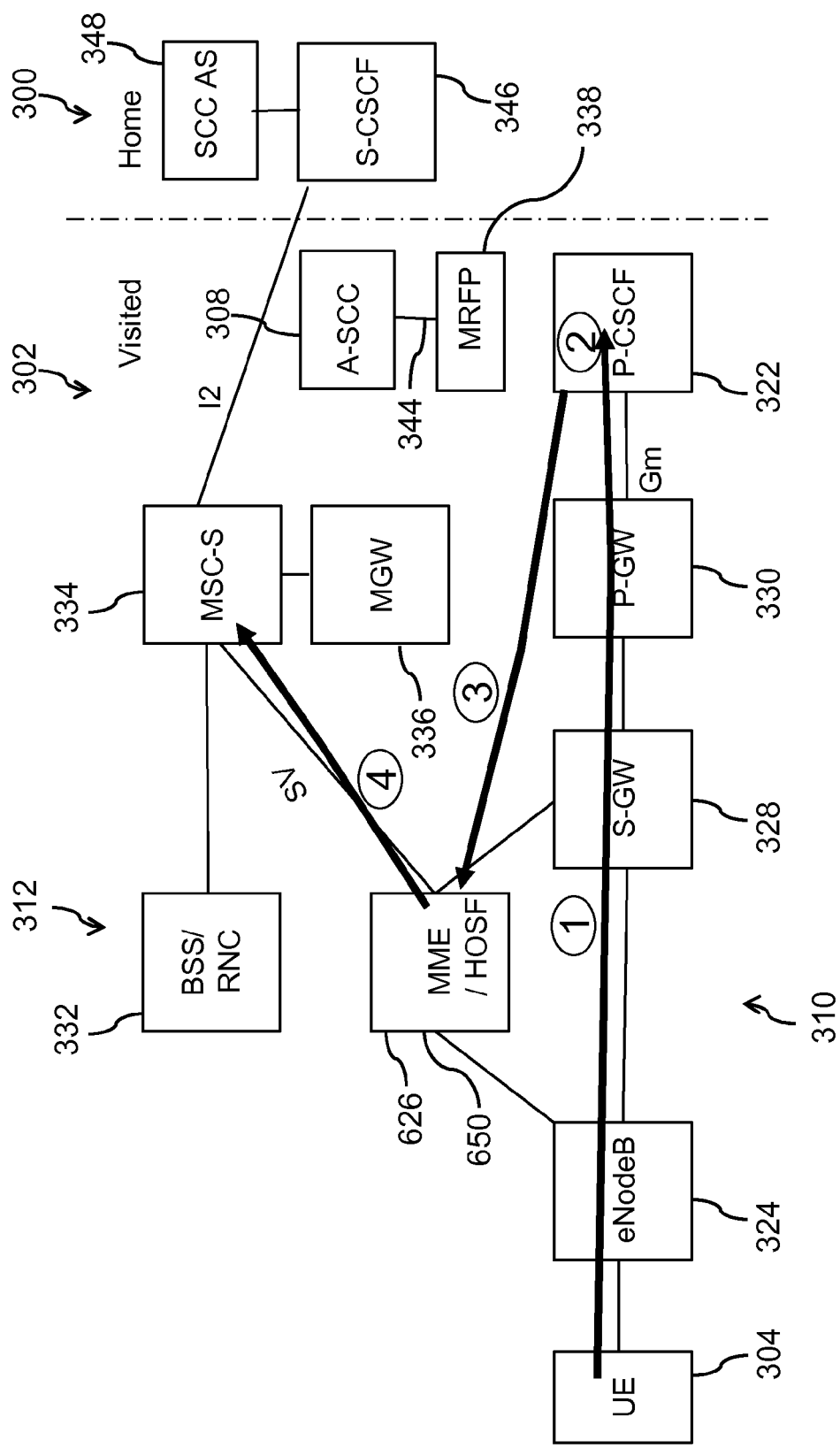
FIG. 6 illustrates a second exemplary embodiment for determining a session transfer node in a serving communication network and providing an address of the session transfer node to a node in the serving communication network according to the invention.

According to a second option according to FIG. 6 for which a P-CSCF 322 is in the serving (visited if roaming) network 302, the following may be executed:

1) As a first step, a UE 304 sends a Tracking Area (TA), a Global Unique Temporary Identity (GUTI, used in the Evolved Packet Core (EPC, see 3GPP Technical Specification 23.401, with EPC being part of the Evolved Packet System (EPS)), allocated by a MME 626), an International Mobility Subscriber Identification (IMSI) to the P-CSCF 322.

2) As a further step, based on these parameters the P-CSCF 322 selects a signaling anchor/an A-SCC 308, e.g., using a table mapping GUTI and TA to A-SCC instances.

3) As a further step, the P-CSCF 322 finds a Handover Selection Function (HOSF) 650 (or a MME 626, with a 1:1 relation between the HOSF 650 and the MME 626) using the TA and the GUTI and informs the HOSF 650 about the A-SCC 308.

When the MME 626 changes, the P-CSCF 322 needs to update the HOSF 650/MME 626 (1:1 relationship between HOSF/MME).

Note that the HOSF 650 described in this application also supports the selection of the handover function, however, here, in this context, we select the A-SCC 308 whereas in Voice over LTE via Generic Access (VoLGA) the selection is between VoLGA and IMS/SRVCC.

4) During the handover (HO), the MME 626 contacts the HOSF 650 which contacts the MSC 334 and includes the signaling anchor.

Note that, as above-mentioned, the HOSF 650 can be the same node as the MME 626. For the purpose of this application, a HOSF 650 is the functionality needed by the MME 626 to select the handover support function.

The VoLGA Forum, see e.g. http://www.volga-forum.com/ has defined in its architecture an Handover Selection Function (HOSF) as follows: In case of a handover, the HOSF decides if the HO request from the MME is for VoLGA/SRVCC or for IMS/SRVCC and routes the request accordingly (i.e. either to the serving VANC (VoLGA Access Network Controller) or to the MSC Server enhanced for SRVCC). HOSF shall support the VANC-UE binding creation and deletion procedures so that it can make these decisions based on the stored record of the serving VANC for the UE. HOSF is a logical functional entity, which can be deployed according to operator's requirements (e.g. separate entity, embedded in MME or VANC).

A usage of the address of the A-SCC 308 by the MSC Server 334 may be as follows:

The MSC Server 334 uses the received address of the A-SCC 308 to route an access transfer request to the selected A-SCC 308 in the visited network 302. The session transfer request is sent when the MSC Server 334 receives a SRVCC PS-CS request as specified in 3GPP Technical Specification 23.216 (also called handover (request) in FIG. 2b). In addition to (or instead of) the STN-SR the address of the A-SCC 308 is used in the session transfer request to route the message to the A-SCC 308.

There might be additional required changes, independent of chosen alternative (option), e.g. regarding the SRVCC call flow the session transfer request can be sent later, since session transfer will be quick when done in a visited network 308. The MSC Server 334 can determine a time when to send a session transfer request depending on whether the A-SCC 308 is in visited network 302 or not.

All in all, it is enabled by the invention to use an A-SCC 308 in the visited network, instead of using an SCC AS 348 in the home network 300. The A-SCC 308 enhances a SRVCC by providing a mobility anchor point in the visited network 302 and hence shorter signaling legs and less time needed for SRVCC to complete, and if the P-GW 330 is in visited network 302: Media path optimization is enabled.

The description above sometimes states that the signaling anchor is included in a message such as a request: in this regard, it is an address of the session transfer function that is included. In a corresponding manner expressions like " . . . sends signaling anchor to . . . " have to be understood as that "an address of the session transfer node in the serving communication network is sent to . . . ".

The invention is furthermore embodied in devices for which exemplary embodiments are described in more detail below in relation to FIG. 7. Reference signs are used for illustration purposes only and are not intended to be limiting.

Figure 7:
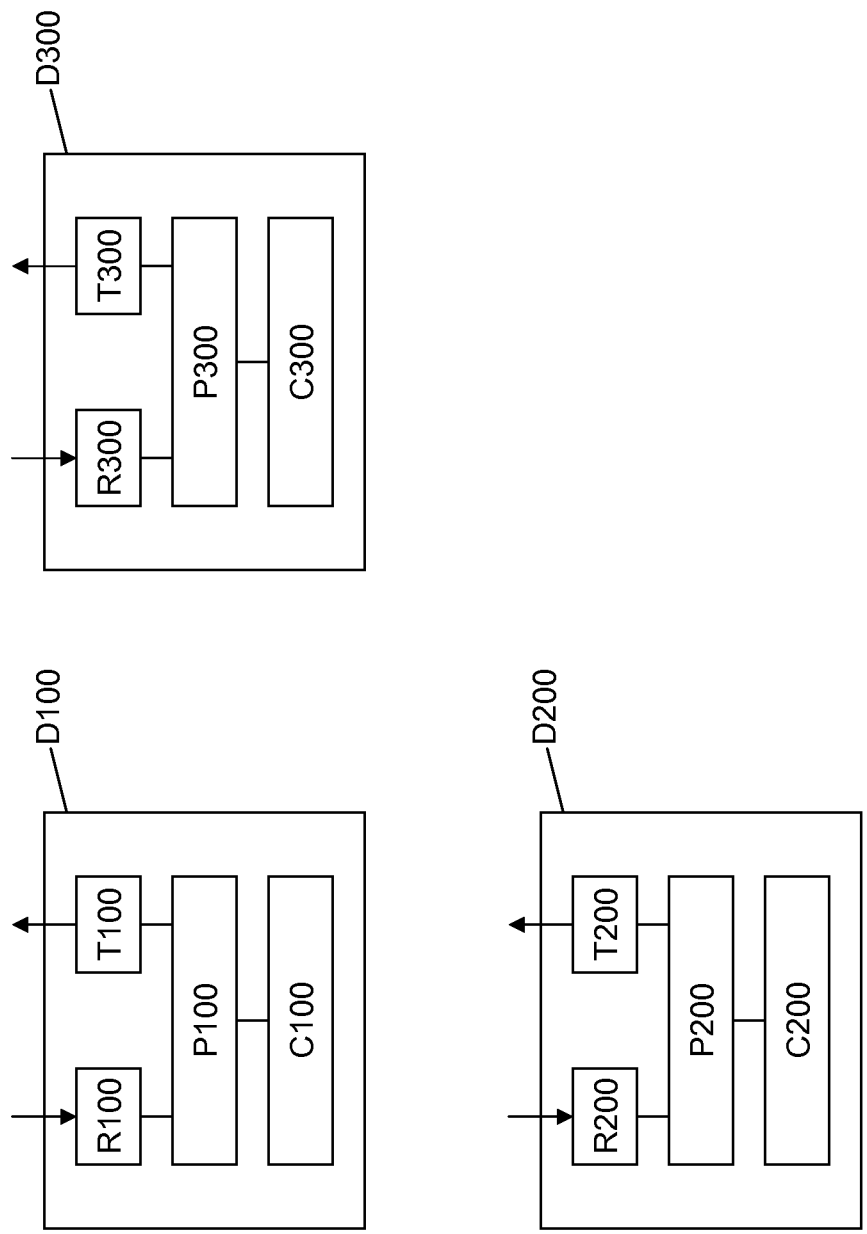
FIG. 7 illustrates exemplary embodiments of devices according to the invention.

FIG. 7 schematically illustrates devices D100, D200, D300 representing exemplary embodiments for a session transfer node of a serving communication network, a node of a serving communication network, and a session control node, respectively.

An exemplary embodiment of a session transfer node D100 comprising a receiving unit R100, a transmission unit T100, a processing unit P100, and a storage unit C100 is depicted. The session transfer node D100 with its individual units R100, T100, P100, C100 may be adapted to perform the steps of the methods described herein as far as related to a session transfer node, wherein the receiving unit R100 is adapted to receive data, the transmission unit T100 is adapted to send data, the processing unit P100 is adapted to process data, for instance to store data at and/or retrieve data from the storage unit C100 and/or to initiate a sending of data via the transmission unit T100.

An exemplary embodiment of a node (of a serving communication network) D200 comprising a receiving unit R200, a transmission unit T200, a processing unit P200, and a storage unit C200 is depicted. The node D200 with its individual units R200, T200, P200, C200 may be adapted to perform any of the methods described herein as far as related to a node of a serving communication network, wherein the receiving unit R200 is adapted to receive data, the transmission unit T200 is adapted to send data, the processing unit P200 is adapted to process data, for instance to store data at and/or retrieve data from the storage unit C200 and/or to initiate a sending of data via the transmission unit T200.

An exemplary embodiment of a session control node D300 (of a serving communication network) comprising a receiving unit R300, a transmission unit T300, a processing unit P300, and a storage unit C300 is depicted. The session control node D300 with its individual units R300, T300, P300, C300 may be adapted to perform any of the methods described herein as far as related to a session control node D300, wherein the receiving unit R300 is adapted to receive data, the transmission unit T300 is adapted to send data, the processing unit P300 is adapted to process data, for instance to store data at and/or retrieve data from the storage unit C300 and/or to initiate a sending of data via the transmission unit T300.

Any of the units R100-300, T100-300, P100-300, C100-300 may consist of one or more sub-units of the same or different technology.

The present invention also concerns computer program(s) comprising portions of software codes, in order to implement the method(s) as described above when operated at a session transfer node, a node of a serving communication network, and a session control node. The computer program(s) can be stored on a computer readable medium. The computer-readable medium can be a permanent or rewritable memory within the respective node or located externally. The computer program(s) can be also transferred to the respective node for example via a cable or a wireless link as a sequence of signals. A computer program may be loaded into a processing unit of any of the aforementioned nodes.

The invention claimed is:

1. A method for improving session continuity for a terminal in a serving communication network distinct from a home communication network of the terminal, wherein the serving communication network comprises a session transfer node for transferring sessions each comprising signaling data and media data from a first access network of the serving communication network to a second access network of the serving communication network, the method comprising:
routing signaling data of a session of the terminal between the first access network and the home communication network via the session transfer node, wherein the session of the terminal utilizes the home communication network;
receiving a session transfer request requesting the transfer of the session from the first access network to the second access network for the terminal;
transferring, in the serving communication network, the session from the first access network to the second access network; and
routing the signaling data of the session of the terminal between the second access network and the home communication network via the session transfer node.

2. The method according to claim 1, wherein the session transfer request comprises terminal identity information, the method further comprising analyzing the terminal identity information to determine the session of the terminal that is to be transferred.

3. The method according to claim 2, wherein the session transfer request further comprises session transfer request identification information, the method further comprising:
determining whether at least one of the terminal identity information and the session transfer request identification information is in accordance with an available policy; and
transferring the session according to a result of the determination.

4. The method according to claim 1, further comprising sending a message to a session transfer node in the home communication network indicating to the home communication network session transfer node that the session transfer node in the serving communication network is responsible for the routing of the signaling data and the transferring of the session.

5. The method according to claim 1, wherein transferring the session comprises transferring the media data from the first access network to the second access network along with the signaling data.

6. The method according to claim 5, wherein the media data is anchored at a node in the serving communication network interfacing the session transfer node.

7. A method for improving session continuity for a terminal in a serving communication network distinct from a home communication network of the terminal, wherein the serving communication network comprises a session transfer node for transferring sessions, each session comprising signaling data, and media data from a first access network of the serving communication network to a second access network of the serving communication network, the method comprising:
receiving an address of the session transfer node; and
sending a session transfer request to the address of the session transfer node requesting a transfer of a session of the terminal from the first access network to the second access network in the serving communication network, signaling data of the session being routed between the second access network and the home communication network, wherein the session of the terminal utilizes the home communication network.

8. The method according to claim 7, further comprising receiving a message requesting the session transfer, wherein sending the session transfer request comprises sending the session transfer request in response to the received message.

9. A method for improving session continuity for a terminal in a serving communication network distinct from a home communication network of the terminal, wherein the serving communication network comprises a session transfer node for transferring sessions, each session comprising signaling data and media data, from a first access network of the serving communication network to a second access network of the serving communication network, the method comprising:
determining an address of the session transfer node; and
sending the address of the session transfer node to a second node of the serving communication network, such that a session of the terminal is transferred from the first access network to the second access network in the serving communication network and signaling data of the session is routed between the second access network and the home communication network in the serving communication network via the session transfer node, wherein the session of the terminal utilizes the home communication network.

10. The method according to claim 9, wherein determining the address of the session transfer node comprises determining the session transfer node in the serving communication network, the method further comprising:
receiving an indication of the selected session transfer node in the serving communication network in the session transfer node in the home communication network; and
determining the address of the session transfer node from the received indication.

11. The method according to claim 9:
wherein the method is performed by a session control node of the serving communication network; and
wherein determining the address of the session transfer node comprises determining the address of the session transfer node in the session control node.

12. The method according to claim 11, wherein sending the address of the session transfer node comprises sending the address of the session transfer node from the session control node to the terminal to enable the sending of the address of the session transfer node to the second node of the serving communication network.

13. The method according to claim 12, further comprising sending the address of the session transfer node from the terminal to a serving mobility node to which the terminal is attached to in the serving communication network to enable the sending of the address of the session transfer node to the second node of the serving communication network.

14. The method according to claim 13, further comprising sending the address from the serving mobility node to the second node of the serving communication network to enable the sending of the address of the session transfer node to the second node of the serving communication network.

15. The method according to claim 9,
further comprising receiving, from the terminal, at least one parameter comprising information about at least one of an identity of a subscriber operating the terminal, a location of the terminal, and an identity of a serving mobility node the terminal is attached to in the serving communication network,
wherein determining the address of the session transfer node comprises determining the address of the session transfer node from the received at least one parameter.

16. The method according to claim 15, wherein sending the address of the session transfer node comprises sending the address of the session transfer node to the serving mobility node to enable the sending of the address of the session transfer node to the second node of the serving communication network.

17. A session transfer node in a serving communication network, the session transfer node configured to improve session continuity for a terminal in a serving communication network distinct from a home communication network of the terminal by transferring sessions, each session comprising signaling data and media data, from a first access network of the serving communication network to a second access network of the serving communication network, the session transfer node comprising:
    a transmission unit configured to route signaling data of a session of the terminal between the first access network and the home communication network;
    a receiving unit configured to receive a session transfer request requesting the transfer of the session from the first access network to the second access network in the serving communication network for the terminal; and
    a processing unit configured to transfer the session from the first access network to the second access network,
    wherein the session of the terminal utilizes the home communication network and the transmission unit is further configured to route the signaling data of the session of the terminal between the second access network and the home communication network via the session transfer node.

18. A node of a serving communication network configured to improve session continuity for a terminal in a serving communication network distinct from a home communication network of the terminal, wherein the serving communication network comprises a session transfer node for transferring sessions, each session comprising signaling data and media data, from a first access network of the serving communication network to a second access network of the serving communication network, the node of the serving communication network comprising:
    a receiving unit configured to receive an address of the session transfer node; and
    a transmission unit configured to send a session transfer request to the address of the session transfer node requesting a transfer of a session of the terminal from the first access network to the second access network, signaling data of the session being routed between the second access network and the home communication network, wherein the session of the terminal utilizes the home communication network.

19. A session control node of a serving communication network configured to improve session continuity for a terminal in a serving communication network distinct from a home communication network of the terminal, wherein the serving communication network comprises a session transfer node for transferring sessions, each session comprising signaling data and media data, from a first access network of the serving communication network to a second access network of the serving communication network, the session control node comprising:
    a processing unit configured to determine an address of the session transfer node; and
    a transmission unit configured to send the address of the session transfer node to a second node of the serving communication network, such that a session of the terminal is transferred from the first access network to the second access network and signaling data of the session is routed between the second access network and the home communication network via the session transfer node, wherein the session of the terminal utilizes the home communication network.

20. A system for improving session continuity for a terminal in a serving communication network distinct from a home communication network of the terminal by transferring sessions, each session comprising signaling data and media data, from a first access network of the serving communication network to a second access network of the serving communication network, the system comprising:
    a session transfer node in the serving communication network, comprising:
        a first transmission unit configured to route signaling data of a session of the terminal between the first access network and the home communication network;
        a first receiving unit configured to receive a session transfer request requesting the transfer of the session from the first access network to the second access network for the terminal; and
        a first processing unit configured to transfer the session from the first access network to the second access network in the serving communication network,
        wherein the session of the terminal utilizes the home communication network the first transmission unit is further configured to route the signaling data of the session of the terminal between the second access network and the home communication network via the session transfer node;
    a second node of a serving communication network comprising:
        a second receiving unit configured to receive an address of the session transfer node; and
        a second transmission unit configured to send the session transfer request to the address of the session transfer node requesting a transfer of the session of the terminal from the first access network to the second access network, signaling data of the session being routed between the second access network and the home communication network; and
    a session control node of the serving communication network, comprising:
        a second processing unit configured to determine the address of the session transfer node; and
        a third transmission unit configured to send the address of the session transfer node to the second node of the serving communication network such that the session of the terminal is transferred from the first access network to the second access network and signaling data of the session is routed between the second access network and the home communication network via the session transfer node.

21. A computer program stored in a non-transitory computer-readable medium product and loadable into a processing unit of a session transfer node in a serving communication network, the computer program comprising code configured to, when operated at the session transfer node, improve session continuity for a terminal in the serving communication network distinct from a home communication network of the terminal, wherein the session transfer node is configured to transfer sessions, each session comprising signaling data and media data, from a first access network of the serving communication network to a second access network of the serving communication network, the code further configured to:
- route signaling data of a session of the terminal between the first access network and the home communication network via the session transfer node;
- receive a session transfer request requesting the transfer of the session from the first access network to the second access network for the terminal;
- transfer the session from the first access network to the second access network in the serving communication network; and
- route the signaling data of the session of the terminal between the second access network and the home communication network via the session transfer node, wherein the session of the terminal utilizes the home communication network.

22. A computer program stored in a non-transitory computer-readable medium product and loadable into a processing unit of a node of a serving communication network, the computer program comprising code configured to, when operated at the node of the serving communication network, improve session continuity for a terminal in the serving communication network distinct from a home communication network of the terminal, wherein the serving communication network comprises a session transfer node for transferring sessions, each session comprising signaling data and media data, from a first access network of the serving communication network to a second access network of the serving communication network, the code further configured to:
- receive an address of the session transfer node; and
- send a session transfer request to the address of the session transfer node requesting transfer of session of the terminal from the first access network to the second access network, signaling data of the session being routed between the second access network and the home communication network, wherein the session of the terminal utilizes the home communication network.

23. A computer program stored in a non-transitory computer-readable medium product and loadable into a processing unit of a session control node in a serving communication network, the computer program comprising code configured to, when operated at the session control node, improve session continuity for a terminal in the serving communication network distinct from a home communication network of the terminal, wherein the serving communication network comprises a session transfer node for transferring sessions, each session comprising signaling data and media data, from a first access network of the serving communication network to a second access network of the serving communication network, the code further configured to:
- determine an address of the session transfer node; and
- send the address of the session transfer node to a second node of the serving communication network such that a session of the terminal is transferred from the first access network to the second access network and signaling data of the session is routed between the second access network and the home communication network via the session transfer node, wherein the session of the terminal utilizes the home communication network.

\* \* \* \* \*

UNITED STATES PATENT AND TRADEMARK OFFICE
CERTIFICATE OF CORRECTION

PATENT NO. : 9,717,023 B2
APPLICATION NO. : 13/382187
DATED : July 25, 2017
INVENTOR(S) : Keller et al.

It is certified that error appears in the above-identified patent and that said Letters Patent is hereby corrected as shown below:

In the Specification

In Column 1, Line 40, delete "Local" and insert -- Local Area --, therefor.

In Column 2, Line 16, delete "parameters" and insert -- parameters, --, therefor.

In Column 2, Line 20, delete "streams" and insert -- streams. --, therefor.

In Column 4, Line 12, delete "FIG. 2-7," and insert -- FIGS. 2-7, --, therefor.

In Column 4, Line 42, delete "(A-SCC))"" and insert -- (A-SCC)" --, therefor.

In Column 5, Line 28, delete "Proxy Call/Session" and insert -- Proxy Call Session --, therefor.

In Column 5, Line 61, delete "Proxy Call/Session" and insert -- Proxy Call Session --, therefor.

In Column 6, Line 11, delete "Accordingly" and insert -- Accordingly, --, therefor.

In Column 7, Line 23, delete "MRFP)." and insert -- (MRFP)). --, therefor.

In Column 8, Line 3, delete "Uniform Address Identifier (URI))" and insert -- Uniform Resource Identifier (URI)) --, therefor.

In Column 8, Line 56, delete "Mobility" and insert -- Mobile --, therefor.

In Column 9, Lines 46-47, delete "IMS Border Control Function (IBCF)" and insert -- Interconnection Border Control Function (IBCF). --, therefor.

In Column 10, Line 11, delete "FIG. 3-6," and insert -- FIGS. 3-6, --, therefor.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*

In Column 10, Line 20, delete "may 206 be" and insert -- 206 may be --, therefor.

In Column 11, Lines 64-65, delete "FIG. 3-6" and insert -- FIGS. 3-6 --, therefor.

In Column 12, Lines 1-2, delete "Proxy Call/Session" and insert -- Proxy Call Session --, therefor.

In Column 12, Line 18, delete "System (UMTS)." and insert -- Service (UMTS). --, therefor.

In Column 12, Line 19, delete "Ran" and insert -- Radio Access --, therefor.

In Column 13, Line 7, delete "International ISDN" and insert -- ISDN --, therefor.

In Column 13, Line 35, delete "IMS Border Control Function (IBCF)." and insert -- Interconnection Border Control Function (IBCF). --, therefor.

In Column 14, Line 13, delete "FIG. 5, 6" and insert -- FIGS. 5, 6 --, therefor.

In Column 14, Line 14, delete "FIG. 3, 4" and insert -- FIGS. 3, 4 --, therefor.

In Column 14, Line 35, delete "etc) and/or" and insert -- etc), and/or --, therefor.

In Column 14, Lines 40-41, delete "User Roaming Number (URI)" and insert -- Uniform Resource Identifier (URI) --, therefor.

In Column 15, Line 5, delete "(GUTI," and insert -- (GUTI), --, therefor.

In Column 15, Line 9, delete "Mobility" and insert -- Mobile --, therefor.

In Column 15, Lines 62-63, delete "visited network 308." and insert -- visited network 302. --, therefor.

In the Claims

In Column 19, Lines 2-7, in Claim 15, delete "further............................network," and insert the same at Line 1, after "claim 9,", as continuation sub-point.

In Column 19, Lines 8-10, in Claim 15, delete "wherein...........................parameter." and insert the same at Line 7, after "network,", as continuation sub-point.

In Column 20, Line 41, in Claim 20, delete "network" and insert -- network, --, therefor.